United States Patent [19]
Schmidt

[11] 3,993,326
[45] Nov. 23, 1976

[54] VEHICLE WITH SELF-STEERING TRAILER

[75] Inventor: Kenneth J. Schmidt, Springfield, Oreg.

[73] Assignee: General Trailer Company, Inc., Springfield, Oreg.

[22] Filed: July 7, 1975

[21] Appl. No.: 593,467

[52] U.S. Cl. ............................. 280/426; 280/81 A
[51] Int. Cl.² .................................... B62D 53/06
[58] Field of Search .......... 280/426, 404, 419, 442, 280/81 A, 98, 99, 100

[56] References Cited
FOREIGN PATENTS OR APPLICATIONS

| | | | |
|---|---|---|---|
| 32,957 | 3/1924 | Denmark | 280/404 |
| 547,810 | 10/1922 | France | 280/426 |
| 388,111 | 5/1965 | Switzerland | 280/426 |

OTHER PUBLICATIONS
B35547 II/63c Patentanmeldung, 9/1956, Germany, Burger.

*Primary Examiner*—M. H. Wood, Jr.
*Assistant Examiner*—John A. Pekar
*Attorney, Agent, or Firm*—Kolisch, Hartwell, Dickinson $ Stuart

[57] ABSTRACT

An elongate vehicle having a steerable front frame and a trailing self-steering rear frame. The rear frame includes a wheel assembly mounted on a steerable subframe adjacent the front end of the rear frame. An elongate rear member extends from the front frame to the rear frame and is pivotally connected to the rear frame of swinging about a substantially upright pivot axis. A differential steering linkage pivotally interconnects the reach member, subframe, and rear frame whereby swinging the reach member relative to the rear frame, as occurs when the front frame turns, results in a smaller angular adjustment of the subframe and steerable front wheel assembly relative to the rear frame to automatically steer the rear frame in a path substantially tracking the front frame through the turn.

12 Claims, 7 Drawing Figures

Fig. 1.

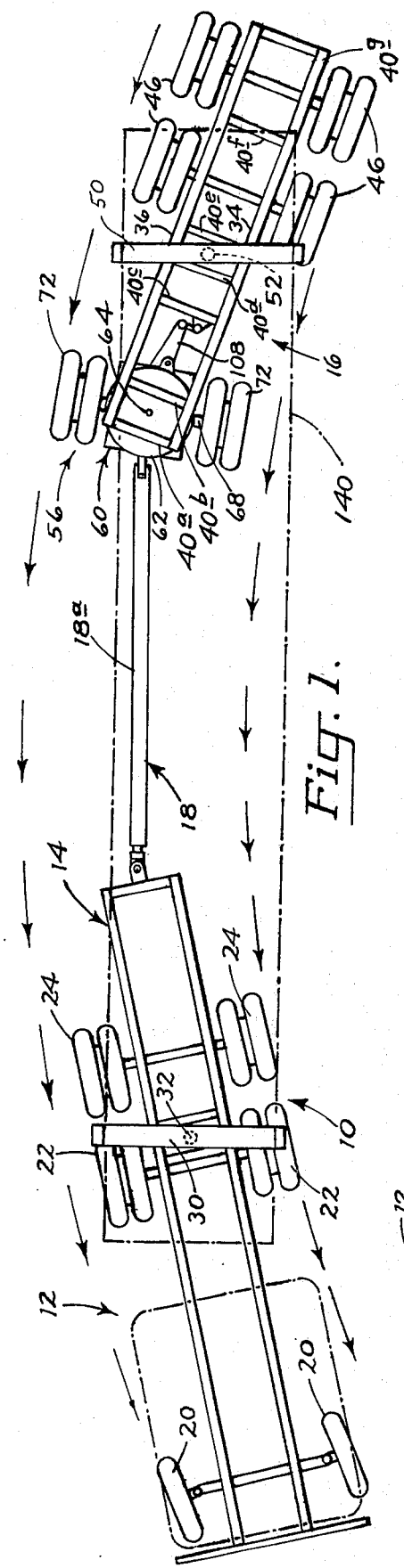
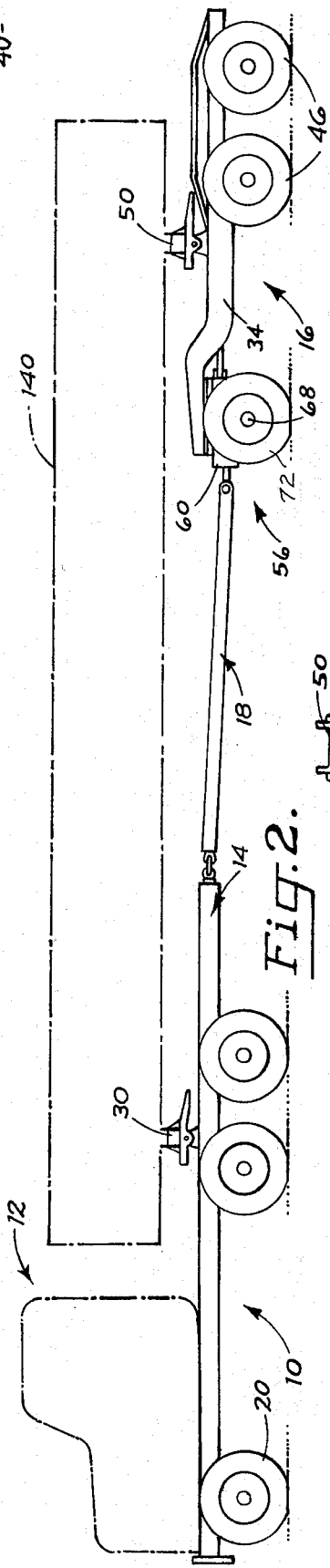
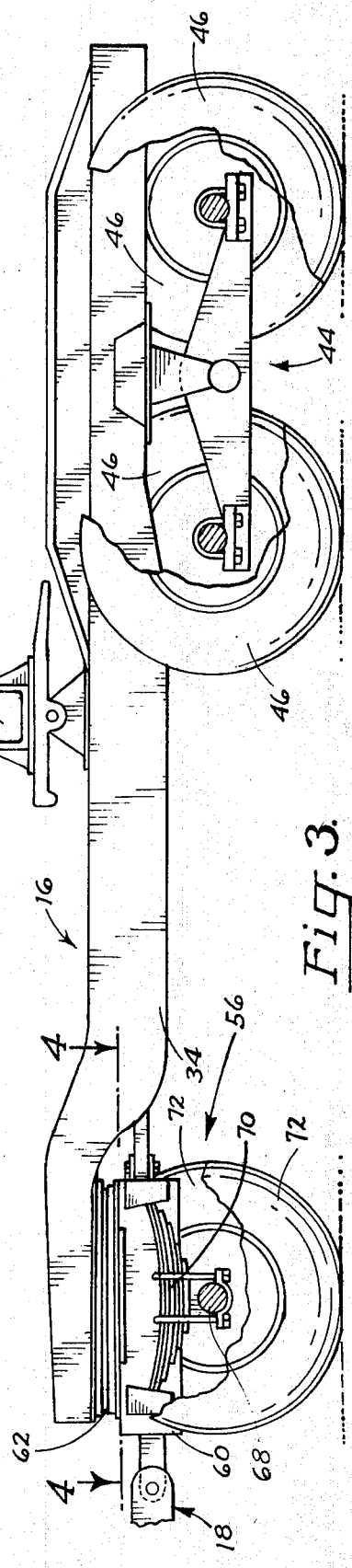

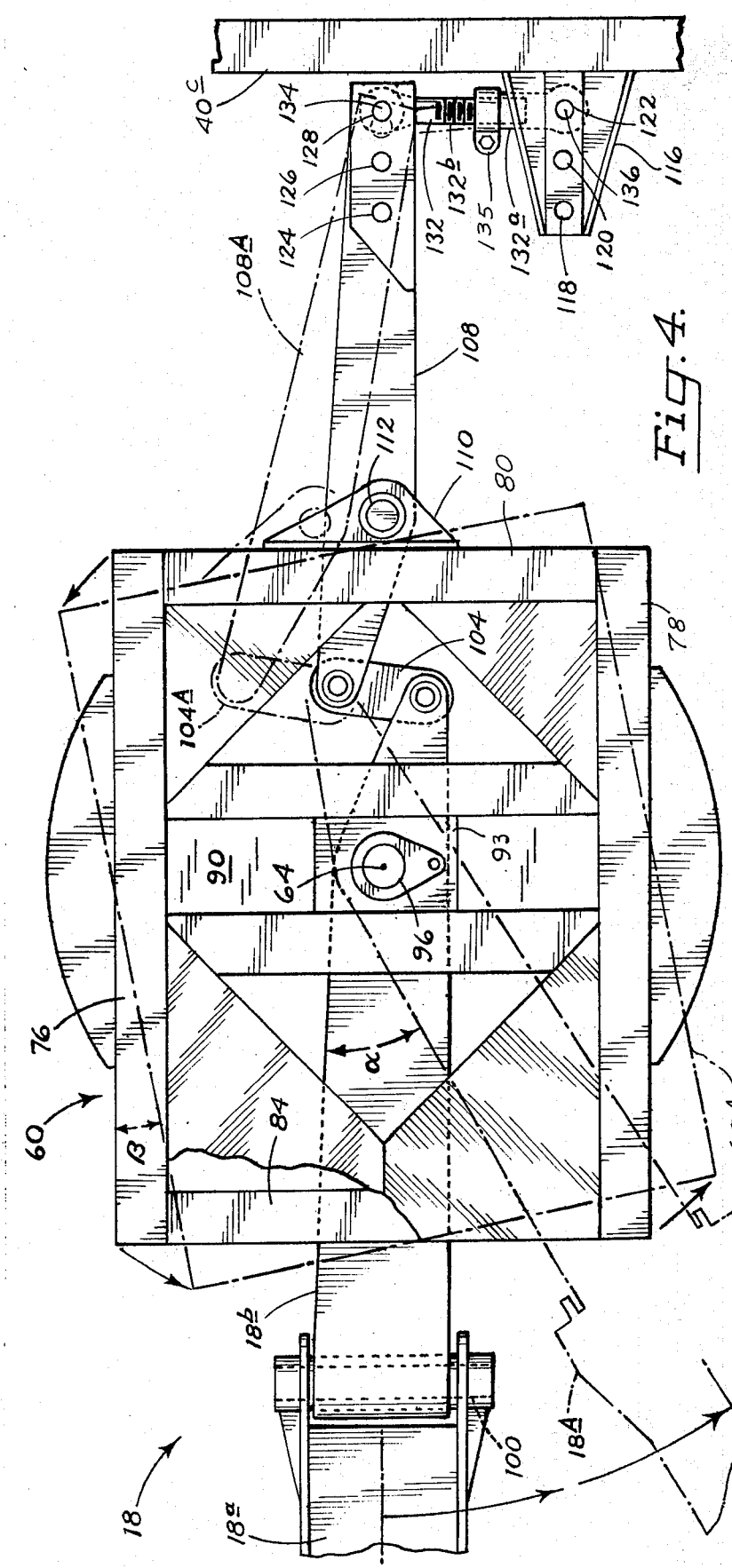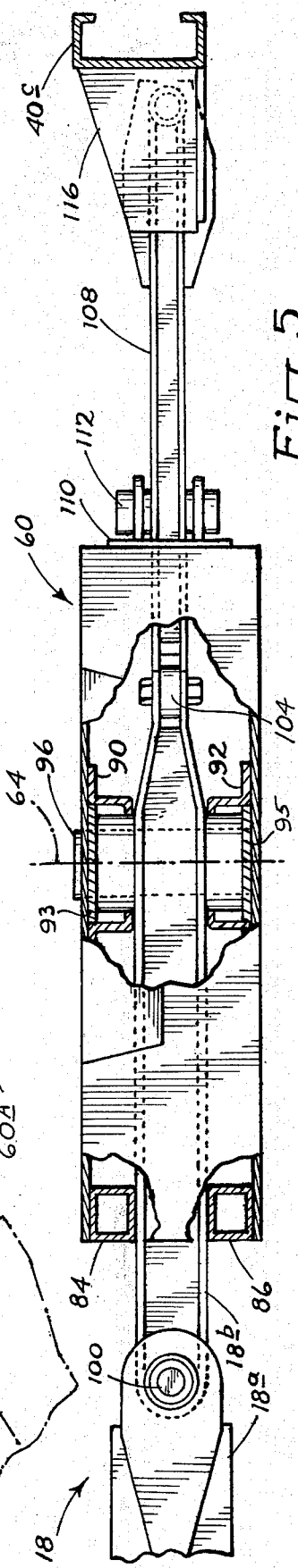
Fig. 4.
Fig. 5.

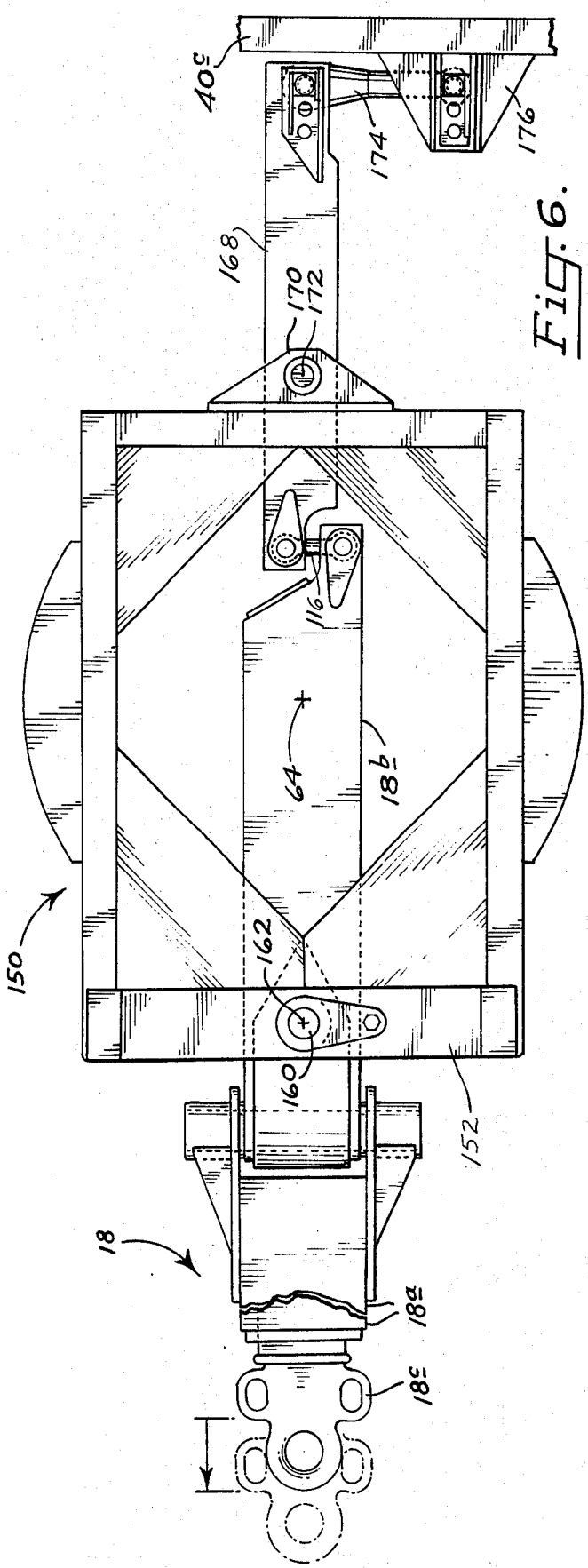
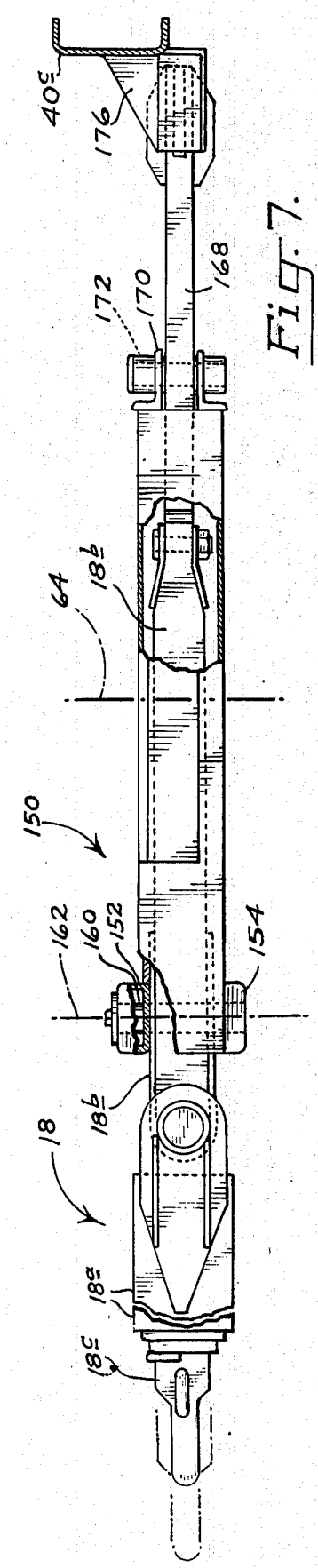

3,993,326

VEHICLE WITH SELF-STEERING TRAILER

BACKGROUND AND SUMMARY OF THE INVENTION

This invention pertains to a vehicle having a steerable front frame, a rear frame spaced rearwardly therefrom, a steerable front wheel assembly on the rear frame, and differential steering linkage operatively connected to the front wheel assembly of the rear frame for producing automatic steering of the rear frame assembly to track substantially in the path of the front frame during a turn.

As is known, unsteered rear load supports on long trailers or other load-handling vehicles will not track well in the path of their pulling tractor during a turn. Instead, there is a natural tendency for the rear end of such vehicle to cut inside the path of the towing portion of the vehicle. This produces a dangerous situation since the rear end of the vehicle, cutting inside the curve, presents a hazard to other vehicles.

In the past, various types of steerable rear load supports for vehicles have been designed, but with less than perfect success being achieved. Previous devices have either been incapable of producing the desired degree of proportionate turning of the rear load support to track properly in the path of the towing portion of the vehicle, or have been unduly expensive and complex both in their initial construction and cost and in the maintenance required for later upkeep.

A primary object of the present invention is to provide a novel vehicle having a steerable rear frame which is so constructed as to overcome the above set out disadvantages of previously designed steerable trailers in a simple and effective manner.

More specifically, an object of the invention is to provide a novel vehicle having a steerable front frame and a wheel supported rear frame, which frames are interconnected by an elongate reach manner. A front wheel assembly on the rear frame is steerable relative to the rear frame and a differential steering linkage interconnects the reach member and steerable wheel assembly in such a manner as to produce proportionate turning of the wheel assembly in the same direction as the reach member turns, but in a preselected ratio less than the angular turning, or swinging, of the reach member. With such turning of the steerable wheel assembly on the rear frame being a proportioned degree less than the swinging of the reach member, the rear frame tracks substantially in the path of the front frame during a turn.

Another object of the present invention is to provide novel differential steering linkage mechanism for producing proportioned steering of the rear frame, in which the linkage interconnection is adjustable to produce tracking of the front and rear frames throughout a variety of lengths of loads carried by the vehicle.

A still further object of the invention is to provide such novel differential steering linkage for the rear frame which includes means for adjusting and maintaining a desired longitudinal alignment between the reach member and longitudinal axis of the rear frame during straight pulling of the rear frame.

DRAWINGS

These and other objects and advantages will become more fully apparent as the following description is read in conjunction with the drawings, wherein:

FIG. 1 is a top plan view of a vehicle constructed according to an embodiment of the invention, with the cab of the vehicle and an elongate load carried thereby illustrated in dot-dashed outline;

FIG. 2 is a side elevation view of the vehicle of FIG. 1;

FIG. 3 is an enlarged side elevation view of a rear wheel supported frame of the vehicle;

FIG. 4 is an enlarged top plan view taken generally along the line 4—4 of differential steering linkage for the rear frame;

FIG. 5 is a side elevation view of the steering linkage illustrated in FIG. 4;

FIG. 6 is a top plan view of a modified form of differential steering linkage for the rear frame; and FIG. 7 is a side elevation view of the steering linkage illustrated in FIG. 6.

DETAILED DESCRIPTION OF AN EMBODIMENT OF THE INVENTION

Referring to the drawings, and first more specifically to FIGS. 1 and 2, at 10 is indicated generally a vehicle according to an embodiment of the invention. The vehicle includes generally an engine-powered tractor 12 having a wheel supported front frame 14, a wheel supported rear frame 16 spaced rearwardly from front frame 14, and an elongate guide reach, or reach member, 18 extending between and interconnecting frames 14, 16 in towing relationship.

Referring to tractor 12, front frame 14 thereof is supported by a pair of steerable, front wheels 20 and laterally spaced, power-driven, dual rear wheels 22, 24 on tandem axles. An elongate, substantially horizontal, load support bunk 30 is rotatably mounted on frame 14 above wheels 22, 24 for pivoting about an upright axis, indicated generally at 32.

Describing rear frame 16, it includes a pair of elongate, substantially parallel, laterally spaced beams 34, 36 which are interconnected by cross members 40a, 40b, 40c, 40d, 40e, 40f and 40g spanning the distance therebetween and being secured, as by welding, at their opposite ends to beams 34, 36. This frame structure is supported adjacent its rear end by tandem axles having dual wheels 46 at opposite sides of the rear end of the rear frame.

An elongate, substantially horizontal, rotatable load support bunk 50 is mounted substantially centrally of frame 16 for pivoting about an upright pivot axis indicated generally at 52 in FIG. 1.

The forward end of rear frame 16 is supported by a steerable front wheel assembly indicated generally at 56. The front wheel assembly is connected to a substantially rectangular dolly box indicated generally at 60 in the figures. Dolly box 60 is connected to the underside of the forward end of frame 16 through a ball race turntable 62 which supports the forward end of rear frame 16 on the dolly box and permits relative rotation between dolly box 60 and frame 16 about a substantially upright pivot axis 64 (see FIGS. 1 and 4).

Wheel assembly 56 includes a single axle 68 mounted through conventional suspension springs 70 on dolly box 60 with dual wheels 72 at opposite ends of the axle providing support for the dolly box and forward end of rear frame 16. Axle 68 and wheels 72 are rotatable with dolly box 60 about pivot axis 64.

Referring to FIGS. 4 and 5, dolly box 60 and mechanism for producing differential steering of wheels 72 is illustrated in greater detail. As is seen, dolly box 60 includes a pair of laterally spaced, elongate side rails 76, 78 which are interconnected adjacent their rear set of ends by a cross member 80. The forward set of ends of side rails 76, 78 are interconnected by a pair of vertically spaced, substantially horizontal, square tubes 84, 86 extending between and secured adjacent their opposite sets of ends, as by welding, to side rails 76, 78. Substantially horizontal gusset plates are secured, as by welding, between the side rails, cross member and tubes at the top and bottom of the dolly box to aid in retaining the substantially rectangular shape of the dolly box. Another pair of vertically spaced, horizontal, elongate cross member 90, 92 of substantially U-shaped cross sections extend transversely of the central region of the dolly box and are secured adjacent their opposite sets of ends to side rails 76, 78. Cross members 90, 92 have plates 93, 95 secured thereto adjacent the central portion of the dolly box. As is seen in FIG. 5, cross members 90, 92 and plates 93, 95 are spaced apart vertically and receive a substantially upright pivot pin 96 therethrough, with the central axis of the pivot pin coinciding with previously described pivot axis 64.

As is best seen in FIGS. 1, 4 and 5, reach member 18 includes an elongate forward section 18a and an elongate rear section 18b pivotally connected to the rear end of section 18a by a substantially horizontal pivot pin 100. A telescoping reach section 18c is slidably received in the forward end of section 18a for extension and retraction relative to section 18a. Locking means (not shown) is operable to secure section 18c against movement relative to section 18a when a fixed-length reach member is needed. Rear section 18b of the reach member extends tubes 84, 86, and is pivotally mounted, intermediate its ends, on pivot pin 96 for swinging in a substantially horizontal plane relative to dolly box 60 and rear frame 16 about pivot axis 64.

As is seen in FIGS. 4 and 5, the rearmost end of section 18b of the reach member terminates within dolly box 60 intermediate pivot pin 96 and cross member 80. Pivotally connected to the rear end of section 18b is a connecting, or inner, link 104. The opposite end of connecting link 104 is pivotally connected to one end of an elongate, substantially horizontal, proportioning, or outer, link 108. A bracket 110 secured to the rear side of dolly box 60 receives a pivot pin 112 vertically therethrough which pivotally connects outer link 108 intermediate its ends to the dolly box.

A bracket 116 is secured to and projects horizontally forwardly from cross member 40c of the rear frame. Bracket 116 has a plurality of bores 118, 120, 122 extending vertically therethrough and spaced apart longitudinally of the rear frame. A similar set of bores 124, 126, 128 are formed in the rear end of outer link 108.

A length adjustable connector 132 is pivotally connected at its opposite ends to bracket 116 and link 108 by pins 134, 136 extending through selected bores in the bracket and outer link. Pins 134, 136 are removable, permitting shifting of connector 132 longitudinally of the rear frame and reconnection in another pair of bores in outer link 108 and bracket 116 to vary the length of the lever arm provided by the portion of link 108 between connector link 132 and pivot pin 112.

Not only is connector 132 adjustable longitudinally of the rear frame, but it also is length adjustable. Explaining further, the connector includes a first portion 132a which has a threaded bore therein, and another section 132b which has a threaded end which is screwed into section 132a. Removal of the connector from the assembly and screwing of parts 132a, 132b relative to each other results in varying the length of the connector. A clamp 135 on section 132a is adjustable to lock them in a selected adjusted position. This adjustment aids in aligning the rear frame with the front frame when moving straight forward or rearward.

A long load 140 indicated in dot-dashed outline is shown supported adjacent its forward end on load bunk 30, and adjacent its rear end on load bunk 50. The load thus spans the distance between the front and rear frames as here illustrated. The pivot mountings for bunks 30, 50 permit the front and rear frames to turn under the load.

Although the vehicle illustrated in the accompanying drawings and described herein is shown set up for carrying an elongate load which spans the distance between front frame 12 and rear frame 16, it should be realized that the vehicle also could be set up to carry a first short load mounted on a pair of load carrying bunks on front frame 12, with a separate short load mounted on a pair of load carrying bunks secured to rear frame 16, with a space between the short load on the front frame and the short load on the rear frame.

To accommodate the vehicle to carry shorter loads it would be a simple matter to provide changeable load carrying bunks. Explaining further, the rotatable bunks illustrated at 30 and 50 on the front and rear frames, respectively, could be made removable and replaced by a pair of nonrotatable bunks secured to front frame 14 and spaced apart longitudinally of the frame, and a second pair of nonrotatable load carrying bunks secured to rear frame 16 and spaced apart longitudinally of the rear frame.

The differential steering mechanism of the present invention works equally as well to produce substantial tracking of the rear frame in the path of the front frame as it moves through a turn, regardless of whether the vehicle is carrying a single long load spanning the distance between the front and rear frames, or a pair of short loads, each of which is mounted on a separate frame of the vehicle.

Describing the operation of the apparatus thus far described, when the vehicle is traveling in a straight line, the longitudinal axes of front frame 14, guide reach 18, and rear frame 16 are aligned. Dolly box 60 also is aligned with the frames and axle 68 extends transversely of this longitudinal axis. When steerable front wheels 20 of the vehicle are turned to take the truck into a turn, the front frame swings to a position as illustrated, which produces pivoting of reach member 18 relative to the rear frame. This also results in a change in the distance between the rear end of the front frame and the front end of the rear frame when a long, rigid load is hauled as illustrated at 140. Telescoping section 18a of the reach member accommodates such changes in distance between the front and rear frames.

Referring to FIG. 4, reach member 18, dolly box 60 and cross member 40c of the rear frame are illustrated in solid outline generally in the positions they occupy when the vehicle is traveling forward in a straight line. In dot-dashed outline are illustrated generally the positions the parts would have when a rather sharp turn is being made by the vehicle. In this turning situation, the guide reach is indicated in dot-dashed outline at 18A, the dolly box at 60A, and links 104, 108 at 104A, 108A, respectively. As is seen, in such a turn guide reach 18 swings through an arc indicated at alpha, α, while the dolly box turns through a proportionately lesser angle beta, β. The differential steering linkage thus produces a preselected angular adjustment of the dolly box and front wheels 72 relative to rear frame 16 which is a desired proportion of the angular adjustment of guide reach 18 and less than the angle through which guide reach 18 swings. The proportionate rate at which dolly box 60 and wheels 72 turn in relation to swinging of guide reach 18 is determined by the positioning of connector 132. By selective shifting of connector 132 longitudinally of the vehicle, adjustments can be made for different turning rates of the rear frame relative to turning of the front frame to accommodate different lengths of guide reaches and loads carried by the vehicle.

Such proportionate steering of the front wheels of the rear frame results in the rear frame being able to track substantially in the same path as that traveled by the front frame as it moves through a turn. As is illustrated in FIG. 1 by the arrows in the curved paths adjacent opposite sides of the vehicle, the front wheels of the rear frame will follow generally in the path of the front wheels of the tractor portion of the truck, and the rear wheels of the rear frame will track substantially in the path of the rear wheels of the tractor when the linkage mechanism is properly adjusted.

Further, by connector 132 being length adjustable it is a simple matter to adjust the linkage assembly whereby the rear frame will follow properly behind the tractor when pulling straight.

As has been mentioned previously, it should be understood that a short load could be supported on load support bunks on the front frame and another short load could be supported independently thereof on the rear frame and proportionate differential steering of the rear frame still would occur to produce substantial tracking of the rear frame in the path of the front frame on moving through a turn.

Referring to FIGS. 6 and 7, another embodiment of differential steering mechanism according to the invention is illustrated. In FIGS. 6 and 7, reach member 18, having sections 18a, 18b, 18c, and cross member 40c of rear frame 16 act as reference to the position of the steering mechanism in the previously described vehicle structure.

A dolly box 150, somewhat similar to that previously described at 60, is connected to the underside of the forward end of frame 16 through a ball race turntable similar to that previously described at 62, and a wheel assembly similar to that at 56 would be mounted thereon for turning with the dolly box relative to frame 16. The pivot axis for dolly box 150 relative to the rear frame provided by its ball race turntable also is indicated in FIGS. 6 and 7 at 64.

Dolly box 150 includes a pair of vertically spaced, substantially horizontal tubes 152, 154 of rectangular cross section extending across its forward end. Rear section 18b of the reach member extends between these tubes. Rear section 18b of the reach member is pivotally connected intermediate its ends to tubes 152, 154 by a pivot pin 160. The rear section 18b thus is mounted for swinging in a substantially horizontal plane relative to the dolly box and rear frame about a pivot axis 162 spaced forwardly from pivot axis 64.

A connecting, or inner link, 166 is pivotally connected at one of its ends to the rear end of section 18b and at its other end is pivotally connected to one end of an elongate proportioning, or outer, link 168. Proportioning link 168 is pivotally connected intermediate its ends through a bracket 170 and pin 172 to the rear end of the dolly box. The rear end of link 168 is connected through a length-adjustable connector 174 to a bracket 176 secured to and projecting forwardly from cross member 40c of the rear frame. Connector 174 may be removed from the position illustrated and replaced in selected positions spaced forwardly therefrom, as previously described for connector 132, to vary the turning ratio of the differential steering mechanism.

The differential steering mechanism of the modified embodiment illustrated in FIGS. 6 and 7 operates in a manner similar to that previously described for the embodiment illustrated in FIGS. 4 and 5. However, it has been found that by pivoting rear section 18b of the reach member on the dolly box in a position forwardly of pivot axis 64, and thereby lengthening the lever arm between pivot axis 162 and connecting link 166 the effect of nonlinearity in the differential steering due to shorter lever arms with small radius arcs may be reduced.

While preferred embodiments of the invention have been described herein, it should be apparent to those skilled in the art that other variations and modifications are possible without departing from the spirit of the invention.

What is claimed and desired to secure by Letters Patent is:

1. In an elongate vehicle having a steerable front frame and a wheel-supported rear frame spaced rearwardly therefrom, apparatus for automatically steering said rear frame in a path substantially tracking said front frame, comprising,
   a subframe,
   means pivotally mounting said subframe on said rear frame adjacent the forward end of the rear frame for rotation relative thereto about a substantially upright pivot axis,
   a wheel assembly mounted on said subframe for rotation therewith,
   an elongate reach member extending between said front and rear frames pivotally connected at its forward end to said front frame and pivotally mounted adjacent its rear end for swinging in a substantially horizontal plane relative to said subframe and said rear frame, and
   connector means operatively connecting said reach member to said subframe for producing turning of said subframe and wheel assembly relative to said rear frame in the direction of swinging of said reach member a selected proportioned degree less than said reach member swings relative to said rear frame, said connector means comprising an elongate proportioning link pivotally connected intermediate its ends to said subframe in a region spaced from said pivot axis, means pivotally connecting one end portion of the proportioning link to said reach member, and means pivotally connecting the proportioning link adjacent its opposite end to said rear frame.

2. The apparatus of claim 1, wherein said means connecting said opposite end of the proportioning link to said rear frame is adjustable to selectively alter the distance from the connection between the link and said rear frame to the pivot connection between the proportioning link and the subframe.

3. The apparatus of claim 1, wherein said reach member is mounted for swinging relative to said subframe and rear frame about said pivot axis for the subframe.

4. The apparatus of claim 1, wherein an end portion of said reach member projects rearwardly from said pivot axis, said proportioning link is pivotally connected to said rearwardly projecting portion of the reach member and extends rearwardly therefrom, said proportioning link being pivotally connected intermediate its ends to said subframe rearwardly of said pivot axis and being connected to said rear frame rearwardly of said subframe.

5. The apparatus of claim 4, wherein said rearwardly projecting portion of said reach member and said proportioning link are interconnected by a connecting link extending therebetween and pivotally connected adjacent its opposite ends to said reach member and proportioning link, respectively.

6. The apparatus of claim 4, wherein said means connecting said proportioning link to the rear frame comprise an adjustment link pivotally connected adjacent its opposite ends to said proportioning link and rear frame and extending at a substantial angle relative to the longitudinal axis of the vehicle, said adjustment link being length adjustable to permit adjustment of the longitudinal alignment of said subframe and rear frame.

7. The apparatus of claim 6, wherein said adjustment link is adjustable longitudinally of the rear frame permitting varying of the length of lever arm provided by said proportioning link.

8. The apparatus of claim 1, wherein said reach member is pivotally connected to said subframe for swinging relative thereto about a pivot axis spaced forwardly of said pivot axis about which said subframe is rotatable relative to said rear frame.

9. In a vehicle having a steerable front frame and a wheel-supported rear frame spaced rearwardly therefrom, a subframe pivotally mounted on said rear frame for swinging about an upright pivot axis relative to said rear frame, a steerable front wheel assembly mounted on said subframe for swinging therewith, means for automatically steering said rear frame in a path substantially tracking said front frame comprising an elongate reach member extending between said front and rear frames and pivotally mounted adjacent its rear end for swinging in a substantially horizontal plane relative to said rear frame and subframe on turning of said front frame, and differential steering linkage means operatively interconnecting said reach member and front wheel assembly for turning said front wheel assembly in the direction of swinging of said reach member through an angle which is a preselected proportioned angle less than the angle through which said reach member swings, said differential steering linkage means comprising an elongate outer link pivotally connected intermediate its ends to said subframe and pivotally connected adjacent one of its ends to said rear frame, and an inner link extending between and pivotally connected adjacent its opposite ends to said reach member and the other end of said outer link.

10. The vehicle of claim 9, which further comprises a length adjustable link interconnecting said outer link and said rear frame to permit adjustment of the longitudinal alignment of said subframe and rear frame.

11. The vehicle of claim 10, wherein said length adjustable link is shiftable longitudinally of the rear frame to selectively vary the distance from the connection between said outer link and rear frame to the pivot connection between the outer link and rear frame to the pivot connection between the outer link and the subframe to permit adjustability of the proportioned turning of the wheel assembly relative to said rear frame on swinging of said reach member.

12. In a vehicle having a steerable front frame and a wheel-supported rear frame spaced rearwardly therefrom including a subframe pivotally mounted on said rear frame for swinging about an upright pivot axis relative to said rear frame, a steerable front wheel assembly mounted on said subframe for swinging therewith, means for automatically steering said rear frame in a path substantially tracking said front frame comprising an elongate reach member extending between said front and rear frames and pivotally mounted adjacent its rear end for swinging in a substantially horizontal plane relative to said rear frame and subframe on turning of said front frame, and differential steering linkage means operatively interconnecting said reach member and front wheel assembly for turning said front wheel assembly in the direction of swinging of said reach member through an angle which is a preselected proportioned angle less than the angle through which said reach member swings, said differential steering linkage means comprising an elongate outer link pivotally connected adjacent one of its ends to said rear frame, pivotally connected adjacent its opposite end to said reach member, and pivotally connected intermediate its ends to said subframe.

* * * * *